(12) United States Patent
Alon et al.

(10) Patent No.: US 8,831,906 B1
(45) Date of Patent: Sep. 9, 2014

(54) TECHNIQUE FOR DETERMINING CLOSEST POINT OF APPROACH

(75) Inventors: Yair Alon, Thousand Oaks, CA (US); Gregory Medlin, Scottsdale, AZ (US)

(73) Assignee: Exelis Inc., McLean, VA (US)

( * ) Notice: Subject to any disclaimer, the term of this patent is extended or adjusted under 35 U.S.C. 154(b) by 319 days.

(21) Appl. No.: 13/083,151

(22) Filed: Apr. 8, 2011

(51) Int. Cl.
G01C 17/38 (2006.01)

(52) U.S. Cl.
USPC .................. 702/150; 702/94; 702/95

(58) Field of Classification Search
USPC ............................ 702/150, 94, 95
See application file for complete search history.

(56) References Cited

U.S. PATENT DOCUMENTS

| | | | | |
|---|---|---|---|---|
| 6,486,831 B1 * | 11/2002 | Martorana et al. | ............ | 342/458 |
| 6,492,937 B1 * | 12/2002 | Sparrow et al. | ............... | 342/125 |
| 6,615,138 B1 | 9/2003 | Schiffmann et al. | | |
| 6,806,828 B1 * | 10/2004 | Sparrow et al. | ............... | 342/418 |
| 7,016,782 B2 | 3/2006 | Schiffmann | | |
| 7,417,583 B2 * | 8/2008 | Wood et al. | .................... | 342/123 |
| 2002/0171586 A1 * | 11/2002 | Martorana et al. | ............ | 342/458 |
| 2003/0225517 A1 * | 12/2003 | Schiffmann | .................. | 701/301 |
| 2007/0216566 A1 * | 9/2007 | Wood | .............................. | 342/41 |
| 2008/0169967 A1 * | 7/2008 | Wood et al. | ..................... | 342/90 |
| 2009/0140909 A1 * | 6/2009 | Wood et al. | ..................... | 342/27 |
| 2009/0177437 A1 * | 7/2009 | Roumeliotis | ................. | 702/150 |
| 2009/0257314 A1 * | 10/2009 | Davis et al. | .................... | 367/125 |
| 2010/0256909 A1 * | 10/2010 | Duggan et al. | ................. | 701/301 |

* cited by examiner

*Primary Examiner* — Janet Suglo
(74) *Attorney, Agent, or Firm* — Edell, Shapiro & Finnan LLC

(57) ABSTRACT

A technique for estimating the closest point of approach (CPA) of an object includes: tracking a range rate of the object based on Doppler measurements of the object; computing a first CPA estimate based on the tracked range rate; separately tracking a position of the object based on position measurements of the object; computing a second CPA estimate based on the tracked position; and computing a fused CPA estimate based on the first and second CPA estimates.

27 Claims, 4 Drawing Sheets

TECHNIQUE FOR DETERMINING CLOSEST POINT OF APPROACH

BACKGROUND

When two objects are moving relative to each other, the range between the objects will achieve its global minimum range value at the closest point of approach (CPA) at the time of closest point of approach (TCPA). In sense and avoid applications, one object, such as an aircraft or other sensor platform, may be receiving measurements about the position and movement of another object or "target." The target may be another aircraft or an airborne projectile or obstacle to be avoided, and the measurements may be range, Doppler, and angle measurements such as those typically generated by radar. These target measurements can be used to estimate CPA and TCPA.

Estimating these parameters involves prediction into the future. Measurement errors are amplified by the prediction process and thus dilute the accuracy of CPA and TCPA estimates. The measured data typically used for this prediction process is either extracted from the target position measurement or from the measured or derived Doppler data. While the position estimation process allows extrapolation of future positions, it is usually less accurate than the Doppler data when used to estimate either CPA or TCPA. However, the more accurate Doppler data does not provide a simple solution for the CPA and TCPA estimates, and it is adversely affected by the target and sensor platform accelerations. Accordingly, there remains a need for an improved technique for estimating CPA and TCPA from target measurements.

SUMMARY

A technique for estimating the closest point of approach (CPA) of an object includes: tracking a range rate of the object based on Doppler measurements of the object; computing a first CPA estimate based on the tracked range rate; separately tracking a position of the object based on position measurements of the object; computing a second CPA estimate based on the tracked position; and computing a fused CPA estimate based on the first and second CPA estimates.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Techniques for the accurate estimation of the Closest Point of Approach (CPA) and the Time to Closest Point of Approach (TCPA) for sense and avoid applications are described. According to one approach, two independent estimates of CPA and TCPA are utilized that are respectively based on Doppler tracking and on separate, independent position tracking. These two estimates are fused together to provide CPA and TCPA estimates that are more accurate than those from currently available, conventional approaches. This integrated approach combines the Cartesian position measurements with Doppler measurements and processes this ensemble using a system of Kalman filters that are designed to provide improved CPA and TCPA estimates.

More specifically, a Doppler tracker includes a first Kalman filter that uses Doppler measurements of the object to produce smoothed estimates of the range rate and the derivative of range rate of the object along with accuracies of these estimates. According to one novel aspect of the system, one computation of CPA and TCPA for the object is made from the smoothed range rate and range rate derivative estimates, together with estimates of the accuracies of the CPA and TCPA values. A position tracker includes a second Kalman filter that produces smoothed estimates of the position and velocity of the object from sensor position measurements (e.g., range and possibly angle(s)). According to another novel aspect of the system, a second computation of CPA and TCPA and the accuracies thereof is made from the output of the second Kalman filter. The second Kalman filter is separate from and independent of the first (Doppler) Kalman filter, and the resulting CPA and TCPA estimates are computed in a completely different manner from the CPA and TCPA estimates derived from the Doppler tracker.

According to yet another novel aspect of the system, to obtain improved estimates for both CPA and TCPA, fused CPA and TCPA values are computed by combining the first (Doppler) and second (position) CPA and TCPA estimates such that the relative weight of the values is controlled by their estimated accuracies (e.g., if the CPA computed from the Doppler tracker is more accurate than the CPA computed from the position tracker, the CPA computed from the Doppler tracker is weighted more heavily in the fused CPA value). A third Kalman filter can be used to track the fused CPA to provide a smoothed CPA estimate. The final estimator also maintains a sense and avoidance maneuver alert capability that monitors CPA growth following an avoidance maneuver.

Figure 1:
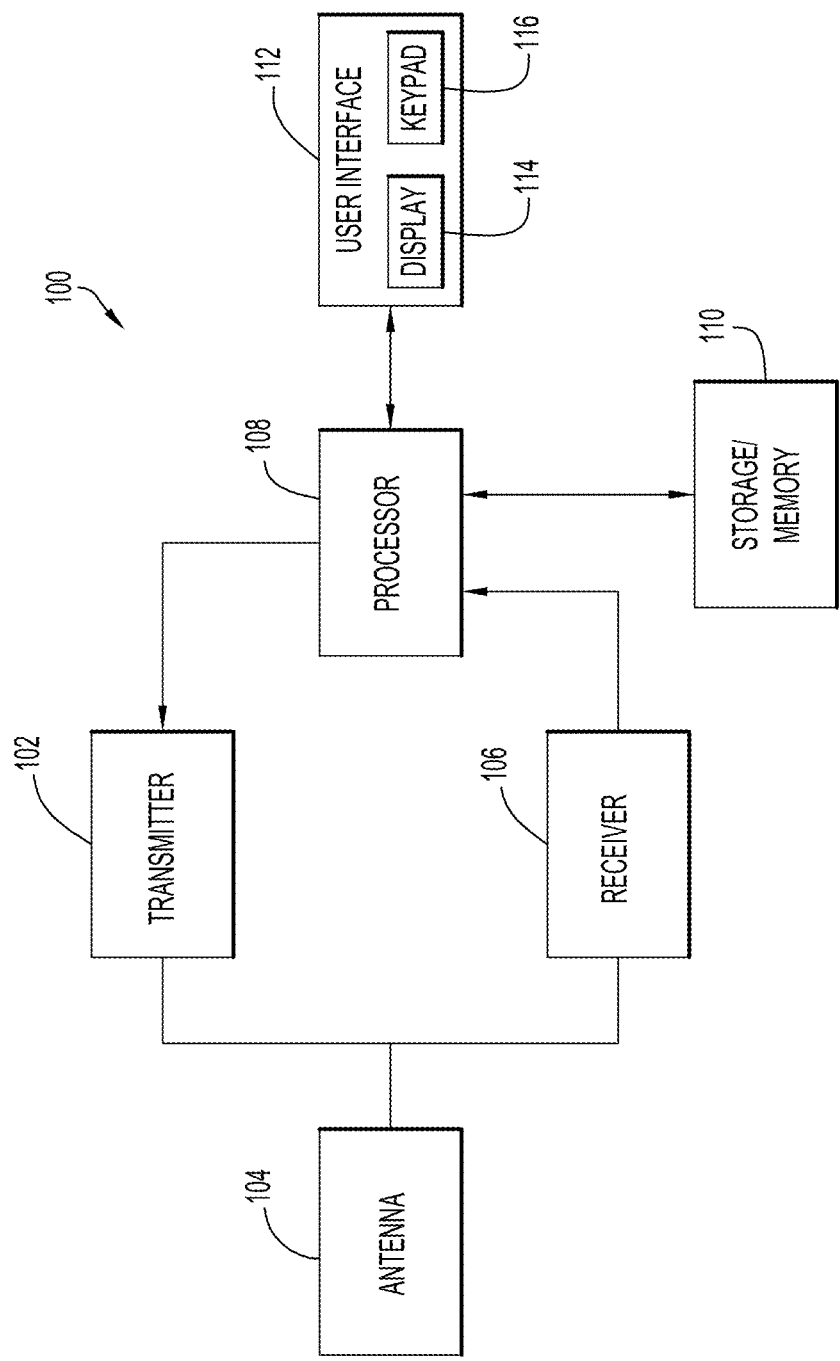
FIG. 1 is a top level block diagram illustrating major components of a sense and avoidance system suitable for determining CPA and TCPA of a target object.

FIG. 1 is a top level block diagram conceptually illustrating major components of a sense and avoidance system 100 capable of determining CPA and TCPA from measurements of a target object. By way of example, sense and avoidance system 100 can be mounted on a movable platform, such as an aircraft, although the techniques described herein are not limited to any particular type of platform and can be employed in other movable platforms (ships, ground vehicles, satellites, etc.) or even in a stationary installation. System 100 includes a transmitter 102 configured to transmit sensing signals into free space via an antenna 104. For example, transmitter 102 can be a radar transmitter than generates RF signals designed to be reflected off objects to provide a reflected signal to system 100. Antenna 104 can be an electronically steerable phase array antenna capable of scanning a shaped beam pattern in different directions relative to its boresight or a mechanically steerable antenna (e.g., moveable via a gimbal system). Radar signals reflected off an object toward the platform are intercepted by antenna 104 and supplied to a receiver 106 for detection. While the example embodiments described herein refer to a radar system for transmitting and receiving signals, it will be appreciated that other types of position and velocity measuring systems (e.g., optical, infrared, and laser-based systems) can be used to generate the measurements used to support determination of CPA and TCPA.

Sense and avoidance system 100 further includes a processing capability represented in FIG. 1 by processor module 108. Processor 108 is capable of executing program instructions (i.e., software) for carrying out various operations and tasks. For example, processor 108 can interpret and respond to data and commands received from and receiver 106, perform computations such as processing of measurements received from receiver 106, cause signals to be transmitted by transmitter 102, cause information to be stored, and control the display 114 of a user interface 112. Processor 108 is, for example, a microprocessor, a microcontroller, a digital signal processor, etc. The "processor" can be implemented as a single device or can comprise a plurality of processing devices, modules, or units. Thus, the term "processor" is not limited to an embodiment in which processing task are necessarily performed on a single device.

A storage capability of system 100 is represented by storage/memory module 110, which can store information relating sensor data such as position and Doppler measurements, tracker state information, and estimated parameters such as CPA and TCPA, as well as other data or information. Storage/memory module 110 can also store program instructions (i.e., software) to be executed by processor 108 to carry out operations. Thus, the operations and methodologies described herein can be carried out by executing instructions stored on a computer readable medium (i.e., software) on a processor or processors located within system 100. As used herein, the term "computer readable medium" refers to non-transitory (tangible) media (e.g., memory or storage devices). Storage/memory module 110 is a tangible processor-readable or computer-readable memory that stores or is encoded with instructions that, when executed by processor 108, cause processor 108 to perform the functions described herein. While FIG. 1 shows a processing environment comprising a data processor 108 that executes software stored in storage/memory module 110, an alternative processing environment may include a fixed data processing element, such as an application specific integrated circuit (ASIC) that is configured, through fixed hardware logic, to perform the functions of the logic. Yet another possible data processing environment is one involving one or more field programmable logic devices or firmware, or a combination of fixed processing elements and programmable logic devices.

As shown in FIG. 1, system 100 also includes a user interface 112 such as a display and alert system that allows a user to interact with system 100 (e.g., enter data and commands and view data such as CPA and TPCA estimates and graphical information such as situation awareness plots of nearby objects. User interface 112 can include a display device 114, user input devices such as a keypad/keyboard 116, and audio input/output devices such as a speaker and microphone. Display device 114 can be any of a wide variety of known devices, such as an LCD display. Keypad/keyboard 116 allows the user to enter alphanumeric characters and can be configured as a physical device and/or as a keyboard or keypad depicted on display device 114. In the latter case, characters can be selected by moving a cursor, or by touching the screen in the case of a touch-screen display. It will be appreciated that user interface 112 may include other types of user-input devices such as a cursor control device, joystick, etc. In general, user interface 112, processor 108, storage/memory module 110, transmitter 102, and receiver 106 can be interconnected in any suitable manner.

Figure 2:
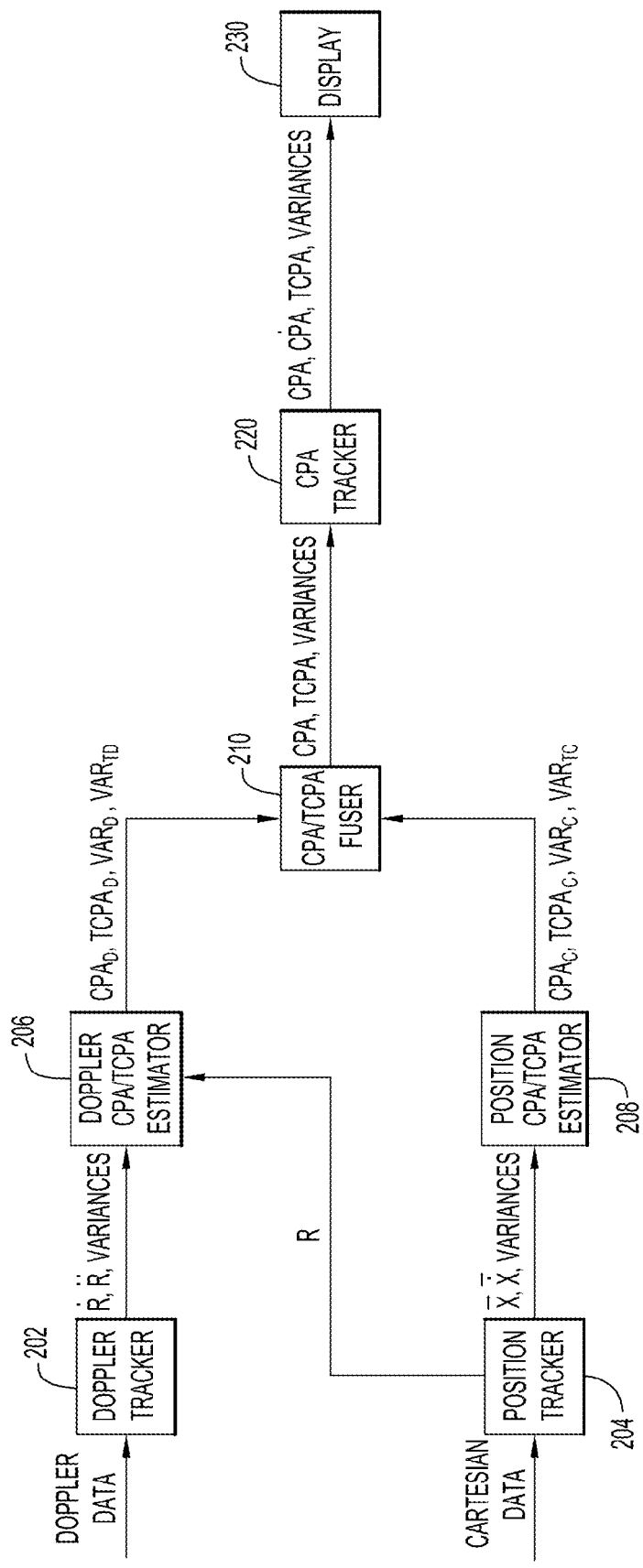
FIG. 2 is a functional block diagram illustrating an example embodiment of a technique for estimating CPA and TCPA.

FIG. 2 is a functional block diagram illustrating an example embodiment of a system for calculating CPA and TCPA. The operations/components described in connection with FIG. 2 can be implemented in software, hardware, firmware, and combinations thereof, using one or more processors such as those represented by processor 108 in FIG. 1. As an overview, a Doppler tracker 202 processes measured Doppler data received from receiver 106 to calculate a smoothed estimate of range rate $\dot{R}$ and range rate first derivative $\ddot{R}$ along with the associated variances of range rate and range rate first derivative. The position data from position measurements (e.g., range and angle) generated by receiver 106 are converted to Cartesian coordinates and supplied to a position tracker 204 that calculates a smoothed position state vector and its associated variances.

Utilizing the equations described herein, a Doppler CPA/TCPA estimator 206 calculates CPA and TCPA estimates from the Doppler track data, and a Position CPA/TCPA estimator 208 calculates CPA and TCPA estimates from the position track data. A CPA/TCPA fuser 210 then fuses the CPA and TCPA values from estimators 206 and 208 in a CPA fusion process. Optionally, to further improve the CPA estimate accuracy, a CPA tracker 220 tracks the fused CPA values to provide a smoothed CPA estimate and extracts the CPA rate of change (CPA velocity) to indicate whether the CPA value is increasing or decreasing with time. Finally, the CPA, TCPA, CPA velocity, and their associated variances are reported to the user (e.g., via a display 230) to be used in the sense and avoidance process. Each of these operations are described in detailed below.

Doppler Tracker

The input to Doppler tracker 202 is the Doppler data $F_D$ or range rate data $\dot{R}$ as measured by the radar or other sensor system. For this application, it is more convenient to represent the Doppler data $F_D$ in range rate terms:

$$\dot{R} = \frac{\lambda F_D}{2}. \tag{1}$$

That is, range rate $\dot{R}$ is equal to the Doppler shift of the detected signal multiplied by $\lambda/2$, where $\lambda$ is the wavelength of the detected signal. While Doppler values $F_D$ are expressed in Hertz, range rate values $\dot{R}$ are expressed in distance/second (e.g., meters/second where $\lambda$ is expressed in meters).

Doppler data accuracy $\sigma_D$ is a function of the Doppler filter bandwidth $\Delta F_D$ and the system signal-to-noise ratio (SNR):

$$\sigma_D = \frac{\Delta F_D}{k\sqrt{SNR}} \tag{2}$$

where k is a scale factor between 1.0 and 3.0. Accordingly, range rate accuracy $\sigma_{\dot{R}}$ can be expressed as:

$$\sigma_{\dot{R}} = \frac{\lambda \Delta F_D}{2k\sqrt{SNR}} \tag{3}$$

By way of example, assuming that there exists a reasonable signal-to-noise ratio in the reflected radar signal to support reliable detection, and by interpolating between Doppler filters, the measured input Doppler accuracy can be shown to be approximately 10 Hz for a 100 Hz filter, with k equal to 1.0 and a SNR of 20 dB.

The Doppler tracker can be implemented utilizing a linear Kalman filter that uses the input measured data to calculate a more accurate, smoothed range rate $\dot{R}$ and range rate derivative $\ddot{R}$ (the second time derivative of the position). The tracker may improve the accuracy of the Doppler estimate by a factor of about three, depending on the tracker implementation, resulting in Doppler measurement accuracy $\sigma_D$ of about 3.3 Hz (or $\sigma_{\dot{R}}$=0.036 m/sec in Ku band), which is more than sufficient for proper CPA calculation utilizing Doppler data.

Whether measuring range, range rate, and/or angular position of a target object, each instantaneous measurement inherently includes some inaccuracy due to the presence of noise and interference. A Kalman filter is capable of producing an estimate of a target's position, velocity, acceleration, or range rate that is more accurate than the estimate from a single measurement by tracking the target's state based on a sequence of measurements over time. Each new measurement is integrated into the target's state, and the degree to which a measurement is relied upon depends on the measurement's relative accuracy compared to that of the tracked state. Upon receiving each new measurement, the tracked state is predicted at the time of the measurement using time-based propagation equations, along with an estimate of the accuracy of the predicted state. The updated (smoothed) state is essentially computed as a weighted average of the predicted state and the newly received measurement. The relative weightings of the predicted state and the new measurement are determined by their relative accuracies, which are reflected in a gain vector. The accuracy of the smoothed state is also updated based on the accuracy of the predicted state and the accuracy of the newly incorporated measurement. This processes is repeated upon receipt of each measurement, resulting in a time-varying state vector that is more accurate than the individual measurements used to generate the state vector.

In the context of the Doppler tracker, the smoothed Doppler state vector calculated by the Kalman filter is given as:

$$\vec{X}_{k+1}^S = \vec{X}k+1^P + \vec{K}_{k+1}(X_{k+1}^M - H\vec{X}k+1^P) \tag{4}$$

The 2×1 state vector $\vec{X}$ for the smoothed and predicted data is given as:

$$\vec{X} = \begin{bmatrix} \dot{R} \\ \ddot{R} \end{bmatrix} \tag{5}$$

where $\dot{R}$ is the range rate and $\ddot{R}$ is the time derivative of range rate (range rate rate). The superscripts P, S, and M respectively refer to the predicted, smoothed, and measured states. That is, the term $\vec{X}_{k+1}^P$ refers to the 2×1 predicted state vector at the time k+1, i.e., the time of the new measurement. The term $\vec{X}_{k+1}^S$ refers to the 2×1 smoothed (updated) state vector at the time k+1 that incorporates the new range rate measurement. The term $X_{k+1}^M$ refers to the measurement, which in this case is simply the new range rate measurement (i.e., a scalar).

The term H refers to the measurement or "transformation" vector, which is a 1×2 vector of the form $$H = [1 \ 0] \tag{6}$$

The H vector essentially transforms the state vector into a form that is consistent with that of the measurement to permit the transformed state vector information to be subtracted from the measurement. In this case, the measurement (range rate) is a scalar, and the predicted state $\vec{X}_{k+1}^P$ is a 2×1 vector. The product of the 1×2 H vector and the 2×1 predicted state vector $\vec{X}_{k+1}^P$ yields a scalar equal to the first term of the predicted state vector, i.e., the predicted range rate $\dot{R}_{k+1}^P$.

The predicted state vector $\vec{X}_{k+1}^P$ at time k+1 is calculated from the previous smoothed state vector at time k as:

$$\vec{X}^P_{k+1} = \Phi \vec{X}_k^S \tag{7}$$

where the state transition matrix (or "propagation matrix") $\Phi$ is given as:

$$\Phi = \begin{bmatrix} 1 & \Delta T \\ 0 & 1 \end{bmatrix} \tag{8}$$

Note that that state transition matrix $\Phi$ essentially predicts the present range rate $\dot{R}_{k+1}^P$ and the present range rate rate (range rate time derivative) $\ddot{R}_{k+1}^P$, and matrix equation (7) can be re-expressed by the following set of scalar equations:

$$\dot{R}_{k+1}^P = \dot{R}_k^S + \ddot{R}_k^S * \Delta T \tag{9}$$

$$\ddot{R}_{k+1}^P = \ddot{R}_k^S \tag{10}$$

The term $\vec{K}_{k+1}$ refers to the 2×1 gain vector computed at time k+1 from the estimated accuracies of the smoothed state vector and the measurement vector. As can be seen from equation (4), the smoothed state vector $\vec{X}_{k+1}^S$ is computed by adding to the predicted state vector $\vec{X}_{k+1}^P$ the difference between the range rate measurement and the predicted range rate, multiplied by the gain vector $\vec{K}_{k+1}$. In simplistic terms, a gain of unity means that full weight is given to the measurement and no weight is given to the predicted state vector such that the smoothed state assumes the new measurement value, while a gain of zero means that full weight is given to the predicted state vector and the new measurement value is ignored. Typically the values in the gain vector $\vec{K}_{k+1}$ are between 0 and 1, based on the relative accuracies of the predicted state vector $\vec{X}_{k+1}$ and the range rate measurement.

The filter gain vector $\vec{K}_{k+1}$ is given $$\vec{K}_{k+1} = \mathrm{Var}\vec{X}_{k+1}^P H^T (H \mathrm{Var}\vec{X}_{k+1}^P H^T + \mathrm{Var} X_{k+1}^M)^{-1} \tag{11}$$

where $\mathrm{Var}\vec{X}_{k+1}^P$ is a 2×2 covariance matrix that estimates the accuracy of the predicted state vector $\vec{X}_{k+1}^P$, and $\mathrm{Var}X_{k+1}^M = \mathrm{Var}\dot{R}_{k+1}^M$, which is the square of the range rate accuracy $\sigma_{\dot{R}}$ of the current range rate measurement, given by equation (3). The track predicted covariance matrix $\mathrm{Var}\vec{X}_{k+1}^P$ is given as:

$$\mathrm{Var}\vec{X}_{k+1}^P = \Phi \mathrm{Var}\vec{X}_k^S \Phi^T + Q \tag{12}$$

where $\mathrm{Var}\vec{X}_k^S$ is the covariance matrix of the smoothed state vector $\vec{X}_k^S$ at the time (k) of the last measurement and the Q matrix represents random effects entering the state estimation process and typically includes target acceleration.

Along with updating the state vector at time k+1 according to equation (4), the smoothed track covariance $\mathrm{Var}\vec{X}k+1^S$ that reflects the accuracy of the smoothed state vector $\vec{X}_{k+1}^S$ is also computed by:

$$\mathrm{Var}\vec{X}_{k+1}^S = (I - \vec{K}_{k+1}H)\mathrm{Var}\vec{X}k+1^P \tag{13}$$

The I matrix is the 2×2 all-diagonal identity matrix.

The matrix equation (12) can be re-expressed by the following set of scalar equations:

$$\text{Var}\dot{R}_{k+1}^{P} = \text{Var}\dot{R}_{k}^{S} + 2\Delta T \text{Cov}\dot{R}\ddot{R}_{k}^{S} \Delta T^2 \text{Var}\ddot{R}_{k}^{S} + q_{11} \quad (14)$$

$$\text{Cov}\dot{R}\ddot{R}_{k+1}^{P} = \text{Cov}\dot{R}\ddot{R}_{k}^{S} + \Delta T \text{Var}\ddot{R}_{k}^{S} + q_{12} \quad (15)$$

$$\text{Var}\ddot{R}_{k+1}^{P} = \text{Var}\ddot{R}_{k}^{S} + q_{22} \quad (16)$$

The term $q_{11}$ is the upper left term of the Q matrix, the term $q_{22}$ is the lower right term of the Q matrix, and the term $q_{12}$ is the upper right and lower left term of the Q matrix.

From these equations, a simplified version of the filter gain vector $\vec{K}_{k+1}$ is given by:

$$\vec{K}_{k+1} = \begin{bmatrix} \alpha \\ \beta \end{bmatrix} \quad (17)$$

where $\alpha$ and $\beta$ are given by:

$$\alpha = \frac{\text{Var}\dot{R}_{k+1}^{P}}{\text{Var}\dot{R}_{k+1}^{P} + \text{Var}\dot{R}_{k+1}^{M}} \quad (18)$$

$$\beta = \frac{\text{Cov}\dot{R}\ddot{R}_{k+1}^{P}}{\text{Var}\dot{R}_{k+1}^{P} + \text{Var}\dot{R}_{k+1}^{M}} \quad (19)$$

The values of the track smoothed variance matrix $\text{Var}\vec{X}_{k+1}^{S}$ are given by:

$$\text{Var}\dot{R}_{k+1}^{S} = (1-\alpha)\text{Var}\dot{R}_{k+1}^{P} = \alpha \text{Var}\dot{R}_{k+1}^{M} \quad (20)$$

$$\text{Cov}\dot{R}\ddot{R}_{k+1}^{S} = (1-\alpha)\text{Cov}\dot{R}\ddot{R}_{k+1}^{P} = \beta \text{Var}\dot{R}_{k+1}^{M} \quad (21)$$

$$\text{Var}\ddot{R}_{k+1}^{S} = \text{Var}\ddot{R}_{k+1}^{P} - \beta \text{Cov}\dot{R}\ddot{R}_{k+1}^{P} \quad (22)$$

This recursive process is then repeated for each new range rate measurement received.

The foregoing example of a Doppler tracker is only one possible implementation, and those skilled in the art will appreciate that the range rate and the range rate derivative can be tracked via linear filtering such as Kalman filtering using a wide variety of implementations.

Doppler CPA/TCPA Estimator

The Doppler CPA/TCPA Estimator employs an equation for the Closest Point Approach (CPA) based on range rate, which is derived in this section. The equation utilizes the range rate $\dot{R}$ and the range rate derivative $\ddot{R}$ as generated by the Doppler tracker to calculate the CPA. An approaching target, defined here as generating a positive Doppler frequency measurement, will either hit the sensor platform or miss the platform.

Figure 3:
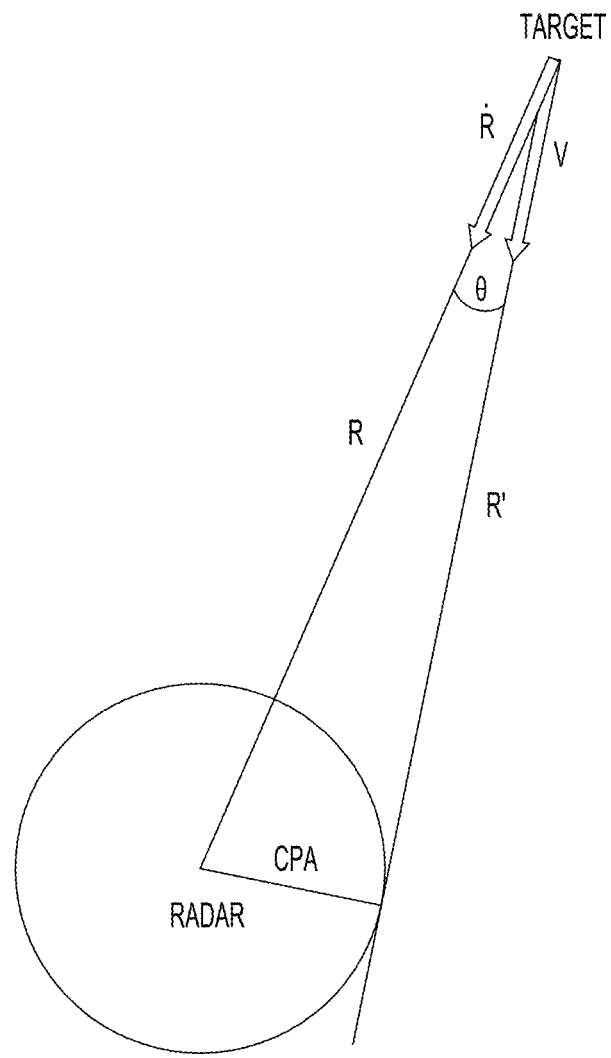
FIG. 3 is a diagram depicting the geometry of a sensor platform and target object as it relates to computation of CPA from the output of a Doppler tracker.

The diagram in FIG. 3 illustrates the geometry of this situation. Consider the position of the target object, the position of the closest point of approach (CPA), and the position of the sensor platform as three vertices of a right triangle. The range R and range rate $\dot{R}$ lie along the line of sight between the target and the receiving antenna, with the range R representing the length of the hypotenuse of the triangle. The CPA is the length of the leg of the triangle between the receiving antenna and the position of the CPA. The third leg of the triangle between the position of the target and the position of the CPA is denoted by R', and the velocity of the target along this direction is denote by v. At the target vertex, the angle θ is formed between the range leg R and the leg R'.

Within this geometry, the range rate $\dot{R}$ and range rate derivative $\ddot{R}$ are known from the Doppler tracker. The range R can be supplied by the position tracker, as shown in FIG. 2. The unknown of interest is the CPA. From the Pythagorean theorem:

$$R^2 = R'^2 + CPA^2 \quad (23)$$

By differentiating both sides of equation (23), the following expression results:

$$R\dot{R} = R'\dot{R}' + CPA \times \dot{CPA} \quad (24)$$

Assuming CPA is not changing during the integration time, equation (24) simplifies to:

$$R\dot{R} = R'\dot{R}' \quad (25)$$

Differentiating both sides of equation (25) with respect to time, yields:

$$\dot{R}^2 + R\ddot{R} = \dot{R}'^2 + R'\ddot{R}' \quad (26)$$

Assuming a non-accelerating target in inertial space ($\ddot{R}'=0$), equation (26) simplifies to:

$$\dot{R}^2 + R\ddot{R} = \dot{R}'^2 \quad (27)$$

Rearranging terms in equation (25) yields:

$$\dot{R}' = \frac{R\dot{R}}{R'} \quad (28)$$

Squaring both sides of equation (28) yields:

$$\dot{R}'^2 = \frac{R^2 \dot{R}^2}{R'^2} \quad (29)$$

Since, from equation (23), $R'^2 = R^2 - CPA^2$, the right side of this expression can be substituted into equation (29) to yield:

$$\dot{R}'^2 = \frac{R^2 \dot{R}^2}{R^2 - CPA^2} \quad (30)$$

Equating the left hand side of equation (27) with the right hand side of equation (30) and rearranging terms yields:

$$CPA_D = \sqrt{\frac{R^3 \ddot{R}}{\dot{R}^2 + R\ddot{R}}} \quad (31)$$

As previous noted, the range value R is provided by the position tracker while the range rate derivative $\ddot{R}$ and range rate $\dot{R}$ values are extracted from the Doppler tracker. The error (variance) in the Doppler-based CPA ($\text{Var}_D$) can be calculated by partial derivity of the CPA value and the individual variances of the position and the range rates as provided by the position and the Doppler tracker.

$$\text{Var}_D = \left(\frac{dCPA}{dR}\sigma_R\right)^2 + \left(\frac{dCPA}{d\dot{R}}\sigma_{\dot{R}}\right)^2 + \left(\frac{dCPA}{d\ddot{R}}\sigma_{\ddot{R}}\right)^2 \quad (32)$$

That is, the position tracker provides $\sigma_R$ (square root of the position variance), and the Doppler tracker provides $\sigma_{\dot{R}}$ and $\sigma_{\ddot{R}}$ (the square roots of the range rate and range rate derivative variances).

The time to the CPA ($TCPA_D$) as calculated from the Doppler process is given from:

$$TCPA_D = \frac{R}{\dot{R}} \quad (33)$$

From the geometry in FIG. 3, it can be shown that this time is, in general, longer than the true $TCPA_{Truth}$ time:

$$TCPA_{Truth} = \frac{R}{\dot{R}}\left(1 - \frac{CPA^2}{R^2}\right) \quad (34)$$

The TCPA variance can be expressed as:

$$\text{Var}_{TD} = \left(\frac{\partial Tcpa}{\partial cpa}\right)^2 Var_D + \left(\frac{\partial Tcpa}{\partial R}\right)^2 \sigma_R^2 + \left(\frac{\partial Tcpa}{\partial \dot{R}}\right)^2 \sigma_{\dot{R}}^2 \quad (35)$$

Position Tracker

An implementation of position tracker 204 shown in FIG. 2 is provided in this section. It will be appreciated that tracking the position of a moving object via Kalman filtering is well known in the art, and the described implementation is merely representative and just one of many possible ways to perform position tracking. The tracked state in this example includes the position and velocity of the target object in three-dimensional Cartesian coordinates x, y, and z, such as Earth-centered Earth-fixed (ECEF) coordinates.

In the case of radar, the position measurements typically include range and azimuth and elevation angles. For simplicity, in this example, it is assumed that the position data (including measurement accuracy information) supplied to the position tracker has already been translated from a measurement coordinate system into the x, y, and z Cartesian coordinate system of the position tracker such that the position tracker is not responsible for coordinate conversion of the raw measurements. Further, the state vectors being tracked in each of the x, y, and z coordinates are decoupled from each other. Using uncoupled x, y, and z state vectors avoids the mathematical complexity of a large covariance matrix and allows the state vector to be propagated substantially independently along each of three orthogonal coordinate axes x, y, and z.

The general expression for the linear case Kalman filter is given in the set of equation below. As with the description of the Doppler tracker, the superscripts S, P, and M respectively indicate the track smoothed, predicted, and measured state vector.

Along each of the three coordinate axes x, y, and z, the updated, smoothed state vector (position and velocity) at input time k+1 is calculated by the expression:

$$\vec{X}_{k+1}^S = \vec{X}_{k+1}^P\_i + \vec{K}_{k+1}(X_{k+1}^M - H\vec{X}_{k+1}^P) \quad (36)$$

For the uncoupled case, the 2×1 state vector $\vec{X}$ for the smoothed and predicted data along the x axis can be represented as:

$$\vec{X} = \begin{bmatrix} x \\ \dot{x} \end{bmatrix} \quad (37)$$

where x is the position and $\dot{x}$ is the velocity of the target object in the coordinate axis direction. The 2×1 state vectors $\vec{X}$ for the smoothed and predicted data along each of the y and z axes can be similarly represented with vector components y and $\dot{y}$ for the position and velocity along the y axis and z and $\dot{z}$ for the position and velocity along the z axis. Since the three coordinate directions are decoupled in this example, for simplicity, the Kalman equations for only the x axis are presented here, with the understanding that identical equations apply to the Kalman filter for the y and z axes.

The term $\vec{X}_{k+1}^P$ refers to the 2×1 predicted state vector at the time k+1, i.e., the time of the new position measurement. The term $\vec{X}_{k+1}^S$ refers to the 2×1 smoothed (updated) state vector at the time k+1 that incorporates the position measurement. The term $X_{k+1}^M$ refers to the position measurement, which in this case is simply the new position measurement along the x axis (i.e., a scalar).

The term H refers to the measurement or transformation vector, which is a 1×2 vector of the form:

$$H = [1\ 0] \quad (38)$$

The H vector essentially transforms the state vector into a form that is consistent with that of the measurement to permit the transformed state vector information to be subtracted from the measurement. In this case, the measurement (position) is a scalar, and the predicted state $\vec{X}_{k+1}^P$ is a 2×1 vector. The product of the 1×2 H vector and the 2×1 predicted state vector $\vec{X}_{k+1}^P$ yields a scalar equal to the first term of the predicted state vector, i.e., the predicted position $x_{k+1}^P$.

Along each coordinate axis x, y, and z, the predicted state vector $\vec{X}_{k+1}^P$ at time k+1 is calculated from the previous smoothed state vector at time k as:

$$\vec{X}_{k+1}^P = \Phi \vec{X}_k^S \quad (39)$$

where the state transition (propagation) matrix $\Phi$ is given as:

$$\Phi = \begin{bmatrix} 1 & \Delta T \\ 0 & 1 \end{bmatrix} \quad (40)$$

Note that that state transition matrix $\Phi$ essentially predicts the present position and the present velocity along each coordinate axis (e.g., $x_{k+1}^P$ and $\dot{x}_{k+1}^P$ along the x axis). For the first order filter described here, with the simplified Cartesian decoupled system that takes into account only the diagonal covariance elements, and assuming linear propagation, the matrix equation (39) can be re-expressed by the following set of scalar equations:

$$x_{k+1}^P = x_k^S + \dot{x}_k^S * \Delta T \quad (41)$$

$$\dot{x}_{k+1}^P = \dot{x}_k^S \quad (42)$$

The term $\vec{K}_{k+1}$ refers to the 2×1 gain vector computed at time k+1 from the estimated accuracies of the smoothed state vector and the measurement vector. As can be seen from equation (36), the smoothed state vector $\vec{X}_{k+1}^S$ is computed by adding to the predicted state vector $\vec{X}_{k+1}^P$ the difference between the position measurement and the predicted position, multiplied by the gain vector $\vec{K}_{k+1}$.

For the state vector along each coordinate axis, the filter gain vector $\vec{K}_{k+1}$ is given by:

$$\vec{K}_{k+1} = \text{Var}\vec{X}_{k+1}^P H^T (H \text{Var}\vec{X}_{k+1}^P H^T + \text{Var}X_{k+1}^M)^{-1} \tag{43}$$

where $\text{Var}\vec{X}_{k+1}^P$ is a 2×2 covariance matrix that estimates the accuracy of the predicted state vector $\vec{X}_{k+1}^P$, and $\text{Var}X_{k+1}^M$ is the square of the position accuracy of the current position measurement (e.g., $\sigma_x^2$ along the x axis or $\text{Var}x_{k+1}^M$). The track predicted covariance matrix $\text{Var}\vec{X}_{k+1}^P$ is given as:

$$\text{Var}\vec{X}_{k+1}^P = \Phi \text{Var}\vec{X}_k^S \Phi^T + Q \tag{44}$$

where $\text{Var}\vec{X}_k^S$ is the covariance matrix of the smoothed state vector $\vec{X}_k^S$ at the time (k) of the last measurement, and the Q matrix represents random effects entering the state estimation process and typically includes target acceleration. For example, the Q matrix can employ the Singer model maneuver probability and time constants.

Along with updating the state vector at time k+1 according to equation (36), the smoothed track covariance $\text{Var}\vec{X}_{k+1}^S$ that reflects the accuracy of the smoothed state vector $\vec{X}_{k+1}^S$ is also computed by:

$$\text{Var}\vec{X}_{k+1}^S = (I - \vec{K}_{k+1} H) \text{Var}\vec{X}_{k+1}^P \tag{45}$$

The I matrix is the 2×2 all-diagonal identity matrix.

For the x axis, the matrix equation (44) can be re-expressed by the following set of scalar equations for each coordinate axis:

$$\text{Var}x_{k+1}^P = \text{Var}x_k^S + 2\Delta T \text{Cov}x\dot{x}_k^S + \Delta T^2 \text{Var}\dot{x}_k^S + q_{11} \tag{46}$$

$$\text{Cov}x\dot{x}_{k+1}^P = \text{Cov}x\dot{x}_k^S + \Delta T \text{Var}\dot{x}_k^S + q_{12} \tag{47}$$

$$\text{Var}\dot{x}_{k+1}^P = \text{Var}\dot{x}_k^S + q_{22} \tag{48}$$

The term $q_{11}$ is the upper left term of the Q matrix, the term $q_{22}$ is the lower right term of the Q matrix, and the term $q_{12}$ is the upper right and lower left term of the Q matrix. Corresponding equations apply to the y and z axes.

From these equations, a simplified version of the filter gain vector $\vec{K}_{k+1}$ for the x axis is given by:

$$\vec{K}_{k+1} = \begin{bmatrix} \alpha \\ \beta \end{bmatrix} \tag{49}$$

where, for each coordinate axis, $\alpha$ and $\beta$ are given by:

$$\alpha = \frac{\text{Var}x_{k+1}^P}{\text{Var}x_{k+1}^P + \text{Var}x_{k+1}^M} \tag{50}$$

$$\beta = \frac{\text{Cov}x\dot{x}_{k+1}^P}{\text{Var}x_{k+1}^P + \text{Var}x_{k+1}^M} \tag{51}$$

Again, corresponding equations apply to the y and z axes.

The values of the track smoothed variance matrix $\text{Var}\vec{X}_{k+1}^S$ the x axis are given by:

$$\text{Var}x_{k+1}^S = (1-\alpha) \text{Var}x_{k+1}^P = \alpha \text{Var}x_{k+1}^M \tag{52}$$

$$\text{Cov}x\dot{x}_{k+1}^S = (1-\alpha) \text{Cov}x\dot{x}_{k+1}^P = \beta \text{Var}x_{k+1}^M \tag{53}$$

$$\text{Var}\dot{x}_{k+1}^S = \text{Var}\dot{x}_{k+1}^P - \beta \text{Cov}x\dot{x}_{k+1}^P \tag{54}$$

with corresponding equations for the y and z axes.

This recursive process is then repeated for each new position measurement received. The resulting Cartesian position and velocity data and their associated variances can be used for CPA and TCPA estimation.

Position CPA/TCPA Estimator

Figure 4:
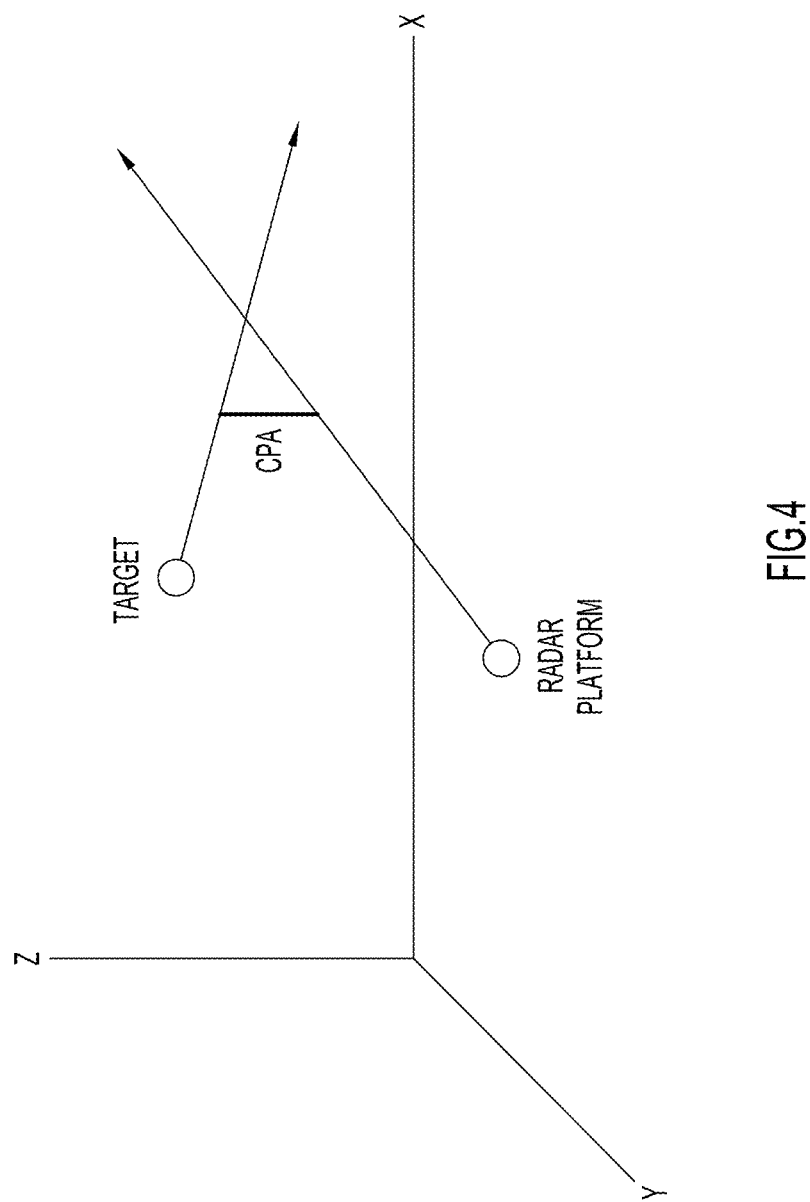
FIG. 4 is a diagram depicting the geometry of a moving sensor platform and a moving target object as it relates to computation of CPA from the output of a position tracker.

As previously described, the CPA is defined as the minimum distance that an observing (e.g., radar) platform and a target object in relative motion may exhibit at some future time. The TCPA is the time of that event as measured from the current time. The target and radar geometry is illustrated in FIG. 4. The TCPA and CPA can be extracted from the distance equation that represents the distance D between the two objects at any future time, given by:

$$D^2 = (x_{R_0} + \dot{x}_{R_0} t - (x_{T_0} + \dot{x}_{T_0} t))^2 + (y_{R_0} + \dot{y}_{R_0} t - (y_{T_0} + \dot{y}_{T_0} t))^2 + (z_{R_0} + \dot{z}_{R_0} t - (z_{T_0} + \dot{z}_{T_0} t))^2 \tag{55}$$

where the indexes R and T respectively indicate the sensor (e.g., radar) platform and target positions in the Cartesian ECEF coordinates, and the subscript "0" refers to position and velocity at time $T_0$. For simplicity, this equation can be rewritten as a difference position and velocity representation:

$$D^2 = (\Delta x + \Delta \dot{x} t)^2 + (\Delta y + \Delta \dot{y} t)^2 + (\Delta z + \Delta \dot{z} t)^2 \tag{56}$$

where $\Delta x$ and $\Delta \dot{x}$ are the position and velocity differences between the sensor platform and target object at time $T_0$ for the x coordinate, given by:

$$\Delta x = x_{R_0} - x_{T_0} \tag{57}$$

$$\Delta \dot{x} = \dot{x}_{R_0} - \dot{x}_{T_0} \tag{58}$$

In other words, $\Delta x$ is the position of the sensor platform relative to the position of the target object along the x axis of the coordinate system at time $T_0$, and $\Delta \dot{x}$ is the velocity of the sensor platform relative to the velocity of the target object along the x axis at time $T_0$. Similar expressions are given for the y and z coordinates.

This function has only one minimum at future (positive) or past (negative) time.

$$\frac{dD}{dt} = 0 \tag{59}$$

$$t_{min} = TCPA_C = -\frac{\Delta x \Delta \dot{x} + \Delta y \Delta \dot{y} + \Delta z \Delta \dot{z}}{\Delta \dot{x}^2 + \Delta \dot{y}^2 + \Delta \dot{z}^2} \tag{60}$$

The minimum distance CPA can be calculated by inserting the minimum time into the distance equation.

$$D_{min}^2 = CPA_C^2 = (x_{R_0} + \dot{x}_{R_0} t_{min} - (x_{T_0} + \dot{x}_{T_0} t_{min}))^2 + \quad (61)$$
$$(y_{R_0} + \dot{y}_{R_0} t_{min} - (y_{T_0} + \dot{y}_{T_0} t_{min}))^2 +$$
$$(z_{R_0} + \dot{z}_{R_0} t_{min} - (z_{T_0} + \dot{z}_{T_0} t_{min}))^2$$

or, $$CPA_C =$$
$$((\Delta x + \Delta \dot{x} * TCPA_C)^2 + (\Delta y + \Delta \dot{y} * TCPA_C)^2 + (\Delta z + \Delta \dot{z} * TCPA_C)^2)^{1/2}$$

The variances of the Cartesian position TCPA ($Var_{TC}$) and CPA ($Var_C$) are calculated from the partial derivatives of all the parameters involved in the calculation as follows:

$$Var_{TC} = \left(\frac{dTCPA}{d\Delta x}\sigma_x\right)^2 + \left(\frac{dTCPA}{d\Delta y}\sigma_y\right)^2 + \left(\frac{dTCPA}{d\Delta z}\sigma_z\right)^2 + \quad (62)$$
$$\left(\frac{dTCPA}{d\Delta \dot{x}}\sigma_{\dot{x}}\right)^2 + \left(\frac{dTCPA}{d\Delta \dot{y}}\sigma_{\dot{y}}\right)^2 + \left(\frac{dTCPA}{d\Delta \dot{z}}\sigma_{\dot{z}}\right)^2$$

$$Var_C = \left(\frac{dCPA}{d\Delta x}\sigma_x\right)^2 + \left(\frac{dCPA}{d\Delta y}\sigma_y\right)^2 + \left(\frac{dCPA}{d\Delta z}\sigma_z\right)^2 + \quad (63)$$
$$\left(\frac{dCPA}{d\Delta \dot{x}}\sigma_{\dot{x}}\right)^2 + \left(\frac{dCPA}{d\Delta \dot{y}}\sigma_{\dot{y}}\right)^2 + \left(\frac{dCPA}{d\Delta \dot{z}}\sigma_{\dot{z}}\right)^2 + \left(\frac{dCPA}{dt}\right)^2 Var_{TC}$$

CPA and TCPA Fuser

The above processes result in two independent CPA measurements, the Doppler process $CPA_D$ and the Cartesian position process $CPA_C$, each with its own variance. Likewise, the processes result in two independent TCPA measurements, the Doppler process $TCPA_D$ and the Cartesian position process $TCPA_C$, each with its own variance. The best possible CPA estimate results from combining or "fusing" the CPA estimates as reported by the two processes, and likewise for the TCPA estimate. The fusion process utilizes the variances of the individual processes, as described below.

Referring again to FIG. 2, CPA/TCPA fuser 210 receives from Doppler CPA/TCPA estimator 206 the CPA estimate $CPA_D$, the TCPA estimate $TCPA_D$ and variances thereof ($Var_D$, $Var_{TD}$). Fuser 210 also receives from Position CPA/TCPA estimator 208 the CPA estimate $CPA_C$, the TCPA estimate $TCPA_C$, and variances thereof ($Var_C$, $Var_{TC}$).

The fused $CPA_F$ can be computed as:

$$CPA_F = CPA_D + \alpha(CPA_C - CPA_D) \quad (64)$$

where $\alpha$ is computed as:

$$\alpha = \frac{Var_D}{Var_D + Var_C} \quad (65)$$

The variance of the fused CPA is given by:

$$Var_F = \frac{Var_C * Var_D}{Var_C + Var_D} \quad (66)$$

The same process can be applied in the calculation of the fused $TCPA_F$, which is computed as:

$$TCPA_F = TCPA_D + \delta(TCPA_C - TCPA_D) \quad (67)$$

where $\delta$ is computed as:

$$\delta = \frac{Var_{TD}}{Var_{TD} + Var_{TC}} \quad (68)$$

The variance of the fused CPA is given by:

$$Var_{TF} = \frac{Var_{TC} * Var_{TD}}{Var_{TC} + Var_{TD}} \quad (69)$$

CPA Tracker

The $CPA_F$ and $TCPA_F$ values as calculated from the fused data can be reported to the system in each detection cycle. Specifically, the resulting $CPA_F$ and $TCPA_F$ estimates can be displayed on the display of a user interface or otherwise reported to a pilot or system operator. Optionally, to further improve the CPA estimate, a CPA tracker can be implemented using the $CPA_F$ and $TCPA_F$ estimates generated by the fuser, as shown in FIG. 2.

In the non-maneuvering case, the CPA is constant, and the CPA tracker will refine its CPA estimate over time, providing a better estimate as more estimates are processed. However, when the sensor platform or the target perform maneuver, the CPA may change. Since, as described below, the CPA tracker computes not only the CPA position but also its velocity, the system is capable of indicating whether CPA is increasing or decreasing over time, e.g., as the result of maneuver. For example, when the CPA is increasing (positive CPA velocity), the system can indicate that the sensor platform maneuver is in the right direction. Reduction in CPA (negative CPA velocity) will alert the user that the systems are closer to collision.

The CPA tracker can employ a linear Kalman filter that tracks the CPA in position and CPA velocity. As with the Doppler and position trackers described above, while an example of a CPA tracker is provided, it will be understood that a variety of other Kalman filter implementations are possible for the CPA tracker.

The general expression for the linear case Kalman filter is given in the set of equation below. As with the description of the Doppler and position trackers, the superscripts S, P, and M respectively indicate the track smoothed, predicted, and measured state vector.

The updated, smoothed state vector (CPA and CPA rate or "CPA velocity") at input time k+1 is calculated by the expression:

$$\vec{X}_{k+1}^S = \vec{X}_{k+1}^P + \vec{K}_{k+1}\left(X_{k+1}^M - H\vec{X}_{k+1}^P\right) \quad (70)$$

For the uncoupled case, the 2×1 state vector $\vec{X}$ for the smoothed and predicted data is given as:

$$\vec{X} = \begin{bmatrix} CPA \\ \dot{CPA} \end{bmatrix} \quad (71)$$

where $\dot{CPA}$ is the CPA velocity of the target object (i.e., the time derivative of CPA). The term $\vec{X}_{k+1}^{P}$ refers to the 2×1 predicted state vector at the time k+1, i.e., the time of the CPA estimate from the CPA fuser. The term $\vec{X}_{k+1}^{S}$ refers to the 2×1 smoothed (updated) state vector at the time k+1 that incorporates the new CPA estimate. The term $X_{k+1}^{M}$ refers to the measurement, which in this case is simply the new CPA estimate from the CPA fuser (i.e., a scalar).

The term H refers to the measurement or transformation vector, which is a 1×2 vector of the form:

$$H = [1 \ 0] \tag{72}$$

The H vector essentially transforms the state vector into a form that is consistent with that of the measurement (the CPA estimate) to permit the transformed state vector information to be subtracted from the measurement. In this case, the measurement (CPA) is a scalar, and the predicted state $\vec{X}_{k+1}^{P}$ is a 2×1 vector. The product of the 1×2 H vector and the 2×1 predicted state vector $\vec{X}_{k+1}^{P}$ yields a scalar equal to the first term of the predicted state vector, i.e., the predicted CPA ($CPA_{k+1}^{P}$).

The predicted state vector $\vec{X}k+1^{P}$ at time k+1 is calculated from the previous smoothed state vector at time k as:

$$\vec{X}_{k+1}^{P} = \Phi \vec{X}_{k}^{S} \tag{73}$$

where the state transition (propagation) matrix $\Phi$ is given as:

$$\Phi = \begin{bmatrix} 1 & \Delta T \\ 0 & 1 \end{bmatrix} \tag{74}$$

Note that that state transition matrix $\Phi$ essentially predicts the present CPA ($CPA_{k+1}^{P}$) and the present CPA velocity ($\dot{CPA}_{k+1}^{P}$). For the first order filter described here, the matrix equation (73) can be re-expressed by the following set of scalar equations:

$$CPA_{k+1}^{P} = CPA_{k}^{S} + \dot{CPA}_{k}^{S} * \Delta T \tag{75}$$

$$\dot{CPA}_{k+1}^{P} = \dot{CPA}_{k}^{S} \tag{76}$$

The term $\vec{K}_{k+1}$ refers to the 2×1 gain vector computed at time k+1 from the estimated accuracies of the smoothed state vector and the measurement vector. As can be seen from equation (70), the smoothed state vector $\vec{X}_{k+1}^{S}$ is computed by adding to the predicted state vector $\vec{X}_{k+1}^{P}$ the difference between the new CPA estimate from the fuser and the predicted CPA value, multiplied by the gain vector $\vec{K}_{k+1}$.

The filter gain vector $\vec{K}_{k+1}$ is given by:

$$\vec{K}_{k+1} = \text{Var}\vec{X}_{k+1}^{P} H^{T} (H \text{Var}\vec{X}_{k+1}^{P} H^{T} + \text{Var}X_{k+1}^{M})^{-1} \tag{77}$$

where $\text{Var}\vec{X}_{k+1}^{P}$ is a 2×2 covariance matrix that estimates the accuracy of the predicted state vector $\vec{X}_{k+1}^{P}$ and $\text{Var}X_{k+1}^{M} = \text{Var}CPA_{k+1}^{M}$, which is simply $\text{Var}_{F}$ given in equation (66) above. The track predicted covariance matrix $\text{Var}\vec{X}_{k+1}^{P}$ is given as:

$$\text{Var}\vec{X}_{k+1}^{P} = \Phi \text{Var}\vec{X}_{k}^{S} \Phi^{T} \tag{78}$$

where $\text{Var}\vec{X}_{k}^{S}$ is the covariance matrix of the smoothed state vector $\vec{X}_{k}^{S}$ at the time (k) of the last CPA estimate.

Along with updating the CPA state vector at time k+1 according to equation (70), the smoothed track covariance $\text{Var}\vec{X}_{k+1}^{S}$ that reflects the accuracy of the smoothed state vector $\vec{X}_{k+1}^{S}$ is also computed by:

$$\text{Var}\vec{X}_{k+1}^{S} = (I - \vec{K}_{k+1} H) \text{Var}\vec{X}_{k+1}^{P} \tag{79}$$

The I matrix is the 2×2 all-diagonal identity matrix.

The matrix equation (78) can be re-expressed by the following set of scalar equations:

$$\text{Var}CPA_{k+1}^{P} = \text{Var}CPA_{k}^{S} + 2\Delta T \text{Cov}CPA\dot{CPA}_{k}^{S} + \Delta T^{2} \text{Var}\dot{CPA}_{k}^{S} \tag{80}$$

$$\text{Cov}CPA\dot{CPA}_{k+1}^{P} = \text{Cov}CPA\dot{CPA}_{k}^{S} + \Delta T \text{Var}\dot{CPA}_{k}^{S} \tag{81}$$

$$\text{Var}\dot{CPA}_{k+1}^{P} = \text{Var}\dot{CPA}_{k}^{S} \tag{82}$$

From these equations, a simplified version of the filter gain vector $\vec{K}_{k+1}$ is given by:

$$\vec{K}_{k+1} = \begin{bmatrix} \alpha \\ \beta \end{bmatrix} \tag{83}$$

where $\alpha$ and $\beta$ are given by:

$$\alpha = \frac{\text{Var}CPA_{k+1}^{P}}{\text{Var}CPA_{k+1}^{P} + \text{Var}CPA_{k+1}^{M}} \tag{84}$$

$$\beta = \frac{\text{Cov}CPA\dot{CPA}_{k+1}^{P}}{\text{Var}CPA_{k+1}^{P} + \text{Var}CPA_{k+1}^{M}} \tag{85}$$

The values of the track smoothed variance matrix $\text{Var}\vec{X}_{k+1}^{S}$ are given by:

$$\text{Var}CPA_{k+1}^{S} = (1-\alpha) \text{Var}CPA_{k+1}^{P} = \alpha \text{Var}CPA_{k+1}^{M} \tag{86}$$

$$\text{Cov}CPA\dot{CPA}_{k+1}^{S} = (1-\alpha) \text{Cov}CPA\dot{CPA}_{k+1}^{P} = \beta \text{Var}CPA_{k+1}^{M} \tag{87}$$

$$\text{Var}\dot{CPA}_{k+1}^{S} = \text{Var}\dot{CPA}_{k+1}^{P} - \beta \text{Cov}CPA\dot{CPA}_{k+1}^{P} \tag{88}$$

This recursive process is then repeated for each new CPA measurement generated by the fuser.

Optionally, the fused TCPA estimates generated by the fuser can also be tracked in a manner similar to the fused CPA. Note that, in the absence of a maneuver by the sensor platform or the target object, the true CPA value does not change over time; thus, the tracked CPA value varies only as a result of reducing errors in the tracked state (or in the event of a maneuver). In contrast, TCPA varies over time as the sensor platform and target object converge toward the closest point of approach; thus, a TCPA tracker tracks a time-changing parameter. It has been found that the fused TCPA estimates are highly accurate; thus, performing the additional tracking computations for TCPA may be of limited benefit in practice.

The approach described herein utilizes a set of Kalman filters applied to the position data and to the Doppler measurement data to extrapolate the future target and sensor platform positions in order to optimize the CPA and TCPA estimates. Despite some computational complexity, the process can readily be implemented in a typical radar system processor, using only a small portion of the CPU's available processing time.

While the described technique for fusing CPA and TCPA estimates derived from a both a Doppler tracker and a position tracker generally produces a more accurate result, optionally, CPA/TCPA estimation techniques can be implemented that relies solely on the Doppler tracker (i.e., the output of Doppler CPA/TCPA estimator 206 in FIG. 2) or that relies solely on the position tracker (i.e., the output of position CPA/TCPA estimator 208 in FIG. 2). According to another option, both estimates can be computed and, rather than fusing the estimates, the more accurate of the two estimates is reported. Optionally, under any of these variations, a CPA tracker can be employed as well.

Having described techniques for determining closest point of approach (CPA) and time to closest point of approach (TCPA), it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of estimating the closest point of approach of an object, comprising:
   tracking in a first tracker a range rate of the object based on Doppler measurements of the object obtained at sequential measurement times;
   computing for each measurement time a first closest point of approach estimate based on the tracked range rate;
   tracking in a second tracker separate from and independent of the first tracker a position of the object based on position measurements of the object obtained at the sequential measurement times;
   computing for each measurement time a second closest point of approach estimate based on the tracked position;
   computing in a processor a fused closest point of approach estimate based on the first and second closest point of approach estimates; and
   reporting, via a user interface, an output closest point of approach estimate based on the fused closest point of approach estimate.

2. The method of claim 1, further comprising:
   tracking in a third tracker the fused closest point of approach estimate, wherein the output closest point of approach estimate is generated as an output of the third tracker.

3. The method of claim 2, further comprising:
   tracking in the third tracker a closest point of approach velocity based on the fused closest point of approach estimate; and
   reporting the closest point of approach velocity via the user interface.

4. The method of claim 1, further comprising:
   computing an accuracy of first closest point of approach estimate; and
   computing an accuracy of the second closest point of approach estimate,
   wherein the fused closest point of approach estimate is computed based on the accuracies of the first and second closest point of approach estimates.

5. The method of claim 1, further comprising:
   computing for each measurement time a first time to closest point of approach estimate based on the tracked range rate;
   computing for each measurement time a second time to closest point of approach estimate based on the tracked position; and
   computing a fused time to closest point of approach estimate based on the first and second time to closest point of approach estimates.

6. The method of claim 5, further comprising:
   computing an accuracy of the first time to closest point of approach estimate; and
   computing an accuracy of the second time to closest point of approach estimate,
   wherein the fused time to closest point of approach estimate is computed based on the accuracies of the first and second time to closest point of approach estimates.

7. The method of claim 6, further comprising:
   tracking in a third tracker the fused time to closest point of approach estimate.

8. The method of claim 1, wherein:
   the first tracker is implemented with a first Kalman filter; and
   the second tracker is implemented with a second Kalman filter that is independent of the first Kalman filter.

9. The method of claim 1, wherein tracking the position of the object comprises:
   tracking separately each coordinate of the position of the object in a coordinate system by which the position of the object is identified.

10. The method of claim 9, wherein tracking each coordinate of the position of the object comprises:
    tracking separately x, y and z coordinates of the position of the object in the Cartesian coordinate system.

11. An apparatus for estimating the closest point of approach of an object, comprising:
    a sensor system configured to generate Doppler and position measurements of an object at each of sequential measurement times;
    a processor configured to: track a range rate of the object based on the Doppler measurements; track a position of the object based on the position measurements independently of the range rate tracking; compute for each measurement time first and second closest point of approach estimates respectively based on the tracked range rate and position; and compute a fused closest point of approach estimate based on the first and second closest point of approach estimates; and
    a user interface configured to report an output closest point of approach estimate based on the fused closest point of approach estimate.

12. The apparatus of claim 11, wherein the processor is further configured to track the fused closest point of approach estimate to generate the output closest point of approach estimate.

13. The apparatus of claim 12, wherein the processor is further configured to track a closest point of approach velocity based on the fused closest point of approach estimate, and wherein the user interface is configured to report the closest point of approach velocity.

14. The apparatus of claim 11, wherein the processor is further configured to:
    compute an accuracy of the first closest point of approach estimate and an accuracy of the second closest point of approach estimate; and
    compute the fused closest point of approach estimate based on the accuracies of the first and second closest point of approach estimates.

15. The apparatus of claim 11, wherein the processor is further configured to:
    compute for each measurement time a first time to closest point of approach estimate based on the tracked range rate;

compute for each measurement time a second time to closest point of approach estimate based on the tracked position; and compute a fused time to closest point of approach estimate based on the first and second time to closest point of approach estimates.

16. The apparatus of claim 15, wherein the processor is further configured to:
compute an accuracy of the first time to closest point of approach estimate;
compute an accuracy of the second time to closest point of approach estimate; and
compute the fused time to closest point of approach estimate based on the accuracies of the first and second time to closest point of approach estimates.

17. The apparatus of claim 16, wherein the processor is further configured to track the fused time to closest point of approach estimate.

18. The apparatus of claim 11, wherein the processor is further configured to:
implement a first Kalman filter to track the range rate of the object; and
implement a second Kalman filter to track the position of the object.

19. A non-transitory processor readable medium storing instructions that, when executed by a processor, cause the processor to:
track a range rate of the object based on Doppler measurements of the object obtained at sequential measurement times;
compute for each measurement time a first closest point of approach estimate based on the tracked range rate; track, independently of the range rate tracking, a position of the object based on position measurements of the object obtained at the sequential measurement times;
compute for each measurement time a second closest point of approach estimate based on the tracked position; and
compute a fused closest point of approach estimate based on the first and second closest point of approach estimates.

20. The processor readable medium of claim 19, storing further instructions that, when executed by the processor, further cause the processor to:
track the fused closest point of approach estimate.

21. The processor readable medium of claim 20, storing further instructions that, when executed by the processor, further cause the processor to:
track a closest point of approach velocity based on the fused closest point of approach estimate.

22. The processor readable medium of claim 19, storing further instructions that, when executed by the processor, further cause the processor to:
compute an accuracy of the first closest point of approach estimate;
compute an accuracy of the second closest point of approach estimate; and
compute the fused closest point of approach estimate based on the accuracies of the first and second estimates.

23. The processor readable medium of claim 19, storing further instructions that, when executed by the processor, further cause the processor to:
compute for each of the measurement times a first time to closest point of approach estimate based on the tracked range rate;
compute for each of the measurement times a second time to closest point of approach estimate based on the tracked position; and compute a fused time to closest point of approach estimate based on the first and second time to closest point of approach estimates.

24. A method of estimating the closest point of approach between a sensor platform and an object, comprising:
tracking in a tracker a time derivative of range R to the object as range rate $\dot{R}$ and a time derivative of range rate $\ddot{R}$ of the object based on Doppler measurements of the object;
computing in a processor a closest point of approach estimate CPA based on the tracked range rate $\dot{R}$, the tracked time derivative of range rate $\ddot{R}$, and the range R to the object according to the expression:

$$CPA = \sqrt{\frac{R^3 \ddot{R}}{\dot{R}^2 + R\ddot{R}}} \; ; \text{ and}$$

reporting, via a user interface, an output closest point of approach estimate based on the closest point of approach estimate CPA.

25. The method of claim 24, further comprising:
computing in the processor a time to closest point of approach estimate TCPA according to the expression:

$$TCPA_{Truth} = \frac{R}{\dot{R}}\left(1 - \frac{CPA^2}{R^2}\right).$$

26. A method of estimating the closest point of approach between a sensor platform and an object, comprising:
tracking in a tracker a position and velocity of the object based on position measurements of the object, wherein the position and velocity of the object are tracked along x, y, and z axes of a coordinate system;
computing in a processor a time to closest point of approach between the sensor platform and the object;
computing in the processor a closest point of approach estimate CPA according to the expression:

$$CPA=((\Delta x+\Delta \dot{x}*TCPA)^2+(\Delta y+\Delta \dot{y}*TCPA)^2+(\Delta z+\Delta \dot{z}*TCPA)^2)^{1/2}$$

where $\Delta x$ and $\Delta \dot{x}$ are the position and velocity differences, respectively, between the sensor platform and the object along the x axis, $\Delta y$ and $\Delta \dot{y}$ are the position and velocity differences, respectively, between the sensor platform and the object along the y axis, $\Delta z$ and $\Delta \dot{z}$ are the position and velocity differences, respectively, between the sensor platform and the object along the z axis, and TCPA is the computed time to closest point of approach; and
reporting, via a user interface, an output closest point of approach estimate based on the closest point of approach estimate CPA.

27. The method of claim 26, wherein the time to closest point of approach TCPA is computed by the expression:

$$TCPA = -\frac{\Delta x \Delta \dot{x} + \Delta y \Delta \dot{y} + \Delta z \Delta \dot{z}}{\Delta \dot{x}^2 + \Delta \dot{y}^2 + \Delta \dot{z}^2}.$$

* * * * *